United States Patent [19]

Swallows

[11] Patent Number: 4,632,627
[45] Date of Patent: Dec. 30, 1986

[54] LOADER, TRANSPORT AND WORKTABLE CART

[76] Inventor: Elmer Swallows, 628 N. Locust, Dexter, Mo. 63841

[21] Appl. No.: 721,212

[22] Filed: Apr. 8, 1985

[51] Int. Cl.⁴ .............................................. B65G 7/00
[52] U.S. Cl. ..................... 414/490; 187/9 R; 187/27; 254/4 R; 280/47.24; 414/590; 414/598; 414/495; 414/642; 414/654; 414/672
[58] Field of Search ............... 414/490, 485, 427, 589, 414/590, 652, 653, 640, 641, 642, 654, 655, 656, 639, 678, 495, 598, 672; 187/9 R, 27; 280/47.28, 47.24; 254/4 R, 4 B, 4 C

[56] References Cited

U.S. PATENT DOCUMENTS

| | | | |
|---|---|---|---|
| 1,537,156 | 5/1925 | Baxter | 414/490 |
| 1,585,915 | 5/1926 | Hohaus | 187/9 R X |
| 1,697,364 | 1/1929 | McCollum et al. | 414/678 |
| 1,941,767 | 1/1934 | Towson | 414/639 |
| 2,215,529 | 9/1940 | Nazarko | 414/490 |
| 3,032,223 | 5/1962 | Kaprielian et al. | 414/655 |
| 3,350,797 | 11/1967 | Dassinger et al. | 280/47.18 X |
| 3,503,623 | 3/1970 | Mun | 280/47.28 |
| 3,873,118 | 3/1975 | Takagi | 280/47.24 X |
| 4,318,655 | 3/1982 | Svensson | 414/490 X |
| 4,421,209 | 12/1983 | Vermette et al. | 187/9 R |

FOREIGN PATENT DOCUMENTS

| | | | |
|---|---|---|---|
| 647682 | 8/1964 | Belgium | 187/9 R |
| 1204590 | 11/1965 | Fed. Rep. of Germany | 187/9 |
| 1059587 | 3/1954 | France | 280/47.24 |
| 1142007 | 9/1957 | France | 187/9 R |
| 935345 | 6/1982 | U.S.S.R. | 414/427 |

Primary Examiner—Frank E. Werner
Attorney, Agent, or Firm—Haverstock, Garrett and Roberts

[57] ABSTRACT

A loader, transport and worktable cart having a base supported by front and rear wheels. An upright column supported by the base and in turn supporting a platform for up and down movement of the platform upon operation of a winch. A stop pivotally supported by the base to stop the front of the platform against downward movement past a predetermined level. A pivotal support for the rear of the platform allowing it to be lowered below the predetermined level so that when the rear of the cart is lifted the platform will be swung toward a generally level orientation. Spring retained cables for locking the platform against the stop. Glides behind the front wheels for aiding movement of the cart up or down steps. Handles extending upwardly and rearwardly from the rear of the base with hand grips positioned to be held by a repair-person standing generally erect when the rear of the cart is raised.

4 Claims, 8 Drawing Figures

LOADER, TRANSPORT AND WORKTABLE CART

BACKGROUND OF THE INVENTION

This invention relates to a loader, transport and worktable cart. The cart is particularly adapted to and useful for servicing window air conditioning units and more particularly enables a single repair-person to service a window air conditioning unit.

Briefly, this invention comprises a cart having a base supported by four wheels. A vertical column extends upwardly from the base, and a horizontal platform is slidable on the vertical column upon operation of a winch. When the cart is wheeled in front of a window ledge, the platform can be raised or lowered to the level of the window ledge, and the air conditioner to be repaired can be slid from the window ledge onto the platform. Then the platform can be moved to another elevation depending upon whether the air conditioner is to be repaired on site or is to be transported to a repair shop. To transport the air conditioner, typically the back of the cart is raised, pivoting the cart about its front wheels. To counteract the swing of the platform to a forward inclination, the platform is lowered prior to lifting the back of the cart. There is a stop assembly pivotally supported by the base and movable into the downward path of the front of the platform. When the platform is lowered, its front end will engage the stop assembly so that further lowering swings the platform to a rearwardly downwardly inclined orientation. Thereafter when the back of the cart is raised, the platform becomes horizontal or slightly rearwardly inclined to support a window air conditioner. The cart has handles positioned and oriented to enable the repair-person to raise and transport the cart with minimum back strain and has other important features which will be discussed hereinafter.

The prior art includes a number of different cart designs. Among these are carts disclosed in U.S. Pat. No. 1,789,025 to Shepherd, Jr.; U.S. Pat. No. 2,881,865 to Lewis; U.S. Pat. No. 3,891,063 to Lucasey et al; U.S. Pat. No. 3,951,286 to Horst; and U.S. Pat. No. 4,131,181 to Vermette. However, none of these patents discloses a cart having the advantages of the present invention. In the Horst patent, a hand truck is disclosed having a winch that moves an L-shaped platform upwardly or downwardly. The platform is not tiltable and the hand truck could not be used to carry a window air conditioner because of the limited movement of the platform. The Lucasey et al patent discloses an arrangement of two platforms neither of which is tiltable. This patent does not disclose a cart suitable for transporting an air conditioner nor capable of the flexibility of use of the present invention. The Lewis, Vermette and Shepherd, Jr. et al patents disclose different cart features but they likewise are not suitable for the purposes of the present invention.

SUMMARY OF THE INVENTION

In general, this combination loader, transport and worktable cart has a base generally formed as a rectangular frame. A pair of relatively large front wheels are mounted on an axle attached to the underside of the frame, with a pair of caster wheels at the back of the base. A pair of handles are curved upwardly and rearwardly from the back of the base so that the cart can either rest on the four wheels or, by elevating the handles, be pivoted to rest on the two front wheels. A pair of glides behind the two front wheels facilitate pushing the cart up and down steps.

A vertical column extends upwardly from the base. A winch, preferably of the hand-crank type, is mounted at the upper end of the vertical column. A bracket is slidably mounted on the vertical column below the winch. A cable leading from the winch is connected to the bracket to move the bracket up and down on the column as the hand crank of the winch is operated. The bracket supports a platform upon which a window air conditioning unit is to rest during use of the cart. As the bracket is moved up and down by operation of the winch, the platform is likewise moved up and down.

A stop assembly comprises a pair of legs swingably fastened to the base near its front, and a cross member is welded between the upper ends of the two legs. When the stop assembly is swung upwardly, it is in the path of the front portion of the platform as the platform is lowered. The bracket that supports the platform is not only slidable on the vertical column, but it can also pivot relative to the vertical column. Therefore, when the platform is lowered and nears the base, the front end will reach the stop assembly. Upon further lowering of the bracket, the stop will prevent the front end of the platform from further downward movement whereas the bracket will pivot and the back of the platform will continue to be lowered. In this position, the front of the platform rests on the firm stop assembly and the back of the platform rests on the base, both solid supports for the platform during transport when bumping may occur. Therefore, with the platform in its lowered position and the back of the cart raised upon lifting the handles, the platform becomes horizontal or slighly rearwardly inclined. This provides a stable support for the window air conditioning unit as the cart is moved from one location to another.

There are a pair of cables held by springs within the platform frame and extendable to connect between the base and the front end of the platform when the platform is in its lowered position. These cables allow the front of the cart to be lifted by grasping the underside of the platform and raising it. This lifting of the front of the cart may be necessary or at least helpful to move the cart up or down steps.

Because of the locations of the handles, the repair-person can lift and move the cart without bending his back. To lift the cart, the repair-person can bend his knees and grasp the handles, then straighten his knees to lift the cart. Thereafter, in an erect position, he can move the cart to a new location. Thus the positions and orientations of the handles minimize strain to the back of the repair-person.

The cart can be readily used to repair an air conditioning unit on site. In this case, the platform would be elevated to a comfortable height. Since this height would be above the pivotally mounted stop, the platform would remain horizontal and could serve as a workbench with the cart resting on all four of its wheels. Alternatively, the cart can be used to transfer an air conditioning unit to the bed of a pick-up truck. The winch is used to raise the platform to an elevation slightly above that of the truck bed so that the air conditioning unit can be slid onto the truck. Since the stop can be pivoted to an out of the way position, the base of the cart will roll beneath the truck, allowing the platform to butt against the truck bed.

In all of the positions, the center of gravity of the load is at a location that makes loading and unloading and transporting of a window air conditioning unit easy enough for a single person to handle. In the transporting position, the load is toward the front wheels which makes lifting the cart relatively easy, requiring the least amount of strain on the part of the operator. When the back of the cart is lowered so that the cart rests on all four wheels, the load is more centered between the front and rear wheels (but still is toward the larger front wheels).

Thus, this cart is particularly useful and convenient for use by only one repair-person in the repair of window air conditioning units. For example, the cart has particular advantages to a repair-person who is primarily working out of his truck, performing many repairs on site, but also performing some repairs at a shop and otherwise often needing to transport an air conditioning unit. Since the cart permits a one-person operation the cost of repair of an air conditioning unit is significantly reduced. If the repair work can be done on-site with the cart used as a workbench, the time required to transport the air conditioner to and from a shop is avoided and the cost of repair is still further reduced. On the other hand, if it is necessary, the cart then can be used to transport the air conditioner to a shop or to a car wash for high pressure cleaning.

The cart can be pushed or pulled to move it. It can be moved up or down steps with the operator remaining in a substantially erect position, thereby minimizing back strain. If necessary the operator can move around to the front of the cart to lift the platform and move the cart up or down steps because the two cables connected between the base and the platform hold the platform firmly against the stop assembly. When the cart is moved up or down steps, the inclined glides behind the front wheels slide on a stair tread and make it easier to push or pull the cart from step to step.

The primary object of the invention is to provide a loader, transport and worktable cart incorporating the structural features as described and illustrated herein and with such modifications thereof as will be apparent to those skilled in the art. Additional objects are to provide such a cart having all the purposes, functions and advantages set forth herein together with those that may appear.

DESCRIPTION OF THE PREFERRED EMBODIMENT

This loader, transport and worktable cart 20 has a base 22 formed by a pair of hollow metal side frame members 24 and 26. The side frame members 24 and 26, like several parts of the cart 20, may be made of square hollow steel pipe. Each side frame member has a front end 28 and a rear end 30 respectively. The side frame members 24 and 26 are held together at their forward ends 28 by a round axle 32 welded or otherwise fastened to the lower sides of the side frame members 24 and 26. A pair of relatively large front wheels 34 and 36 are mounted on the outer ends of the axle 32. These wheels 34 and 36 preferably have hard rubber treads.

A cross frame member 38 extends between and is welded to the side frame members 24 and 26 a few inches forward of their rear ends 30. The cross frame member 38 is preferably made of the same square hollow steel pipe as the side frame members 24 and 26. A pair of caster wheels 40 and 42 are mounted at the back of the base 22 generally at the intersection between the side frame members 24 and 26 and the cross frame member 38. As is conventional, the caster wheels 40 and 42 can swivel in 360° circles, allowing the cart 20 to be turned as it is pushed or pulled while resting on all four wheels.

Figures 5, 7:
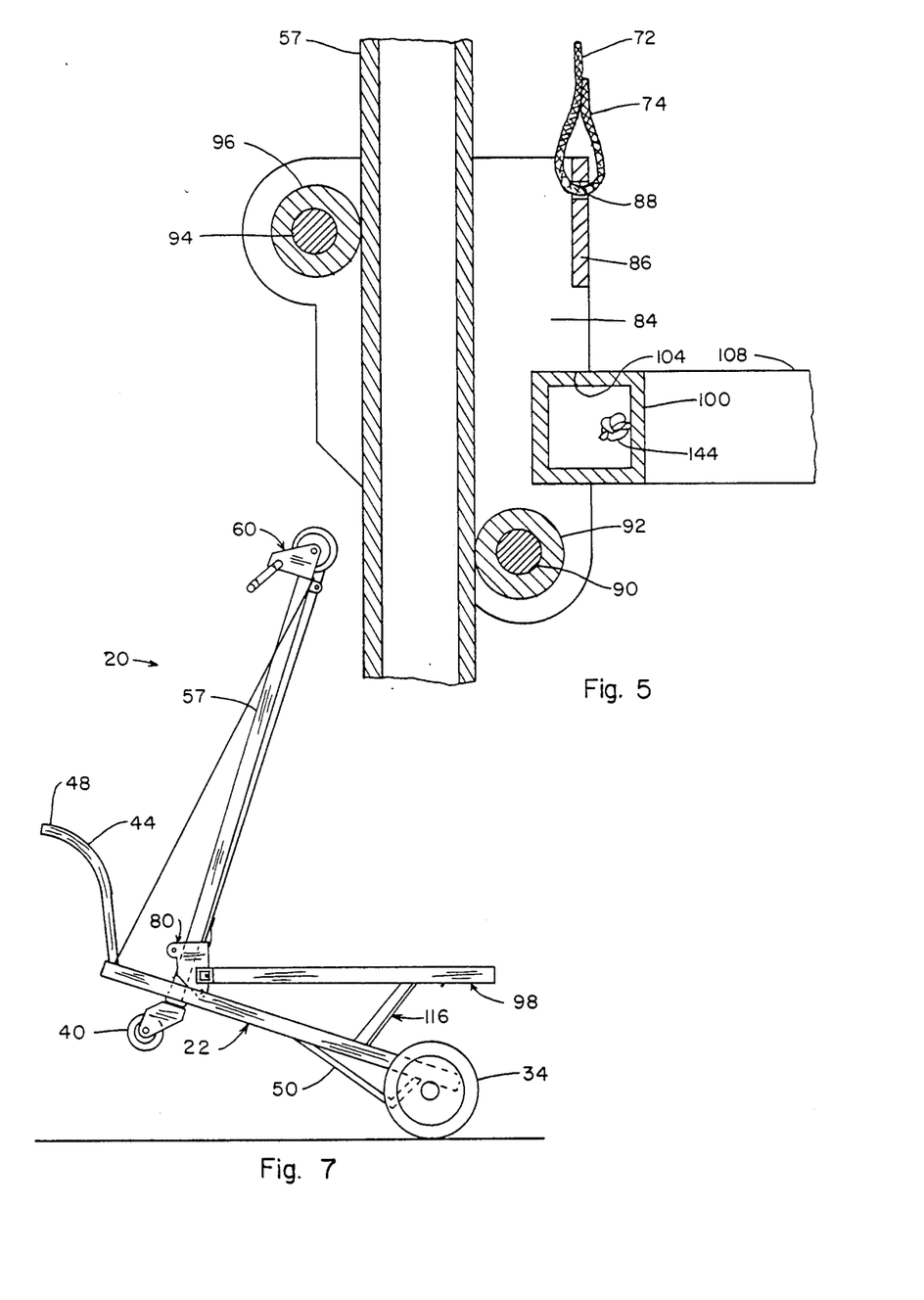
FIG. 5 is an enlarged view in medial section generally through the center of the platform support bracket and the vertical column.
FIG. 7 is a side elevation view of the cart in a transporting position.

A pair of handles 44 and 46 extend upwardly and rearwardly from the side frame members 24 and 26 adjacent their rear ends 30. The handles 44 and 46 are curved rearwardly and each handle has a grip end 48. When the cart is resting on all four wheels, as in FIG. 1, the grip ends 48 are inclined slightly downwardly so that when the cart 20 is tilted about its front wheels 34 and 36 with its rear end elevated (as shown in FIG. 7), the grip ends 48 of the handles 44 and 46 will be substantially horizontal.

Figure 1:
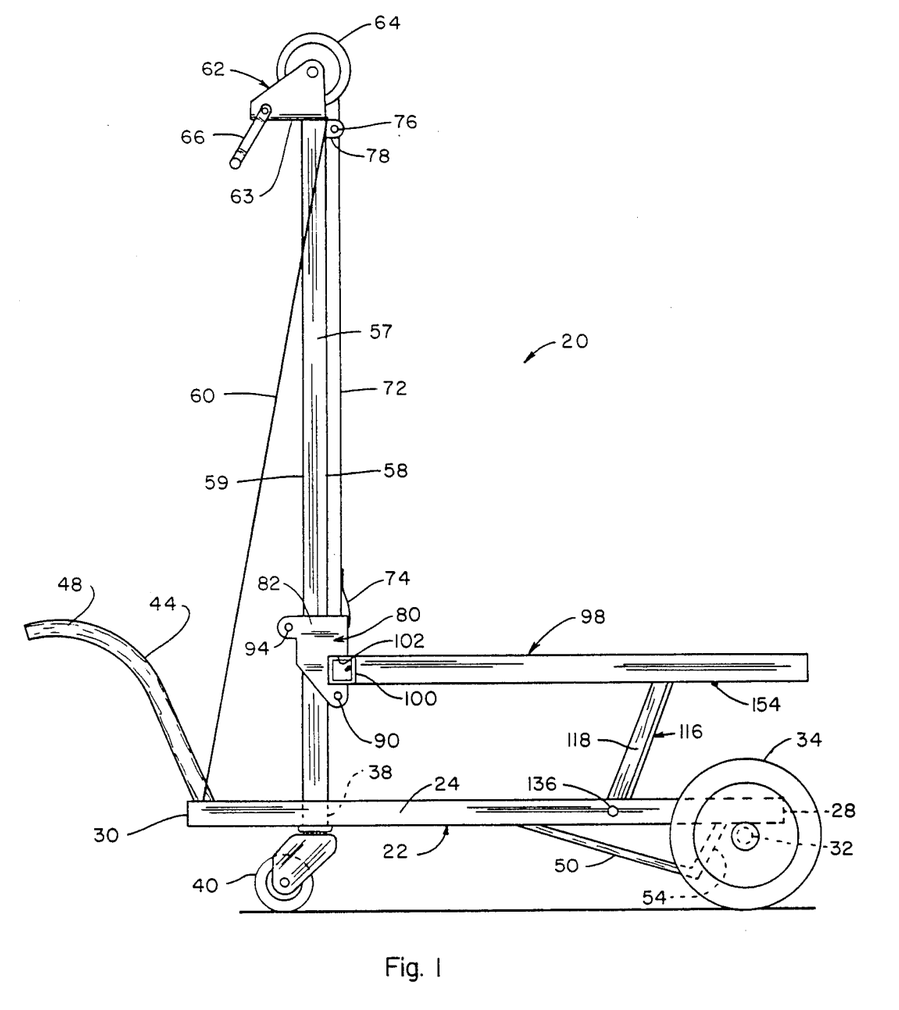
FIG. 1 is a side elevation view of the loader, transport and worktable cart.

A pair of inclined glides 50 and 52 are connected below the side frame members 24 and 26 respectively. The rearward ends of the glides 50 and 52 are welded to the side frame members 24 and 26 about halfway between the front and rear ends 28 and 30 thereof. The forward ends of the glides 50 and 52 are welded to downwardly extending braces 54 and 56, respectively, the upper ends of which are welded to the side frame members 24 and 26 respectively. These glides 50 and 52 and the braces 54 and 56 are made of bar stock and may be either round or square in cross-section. The glides 50 or 52 are downwardly inclined in a forward direction as illustrated in FIG. 1 and extend forward of the backs of the wheels 34 and 36. The glides 50 and 52 assist in pushing or pulling the cart 20 up or down steps as will be described.

An upright column 57 extends upwardly from the center of the cross frame member 38. The upright column 57 is welded to the cross frame member 38 and preferably is of the same hollow square pipe as the frame members 24, 26 and 38. Preferably, the upright column 57 has a flat front face 58 and a flat rear face 59 that function as will be described. As a safety precaution, there may be of pair of cables 60 and 61 extending between the upper end of the vertical column 57 and the side frame members 24 and 26 adjacent their rear ends 30. A hand operated winch 62 is affixed to the upper end of the vertical column 57. The winch 62 is of conventional design with a frame 63 that supports a pulley 64, a rotatable handle 66, and a gear mechanism 68 that establishes a mechanical advantage between the handle 66 and the pulley 64. A metal cable 70 is wound about the pulley 64. The cable 70 has a downwardly extending span 72 with a loop 74 at its lower end. The downwardly extending span 72 passes over the front of a roller 76 supported by a bracket 78 that is welded to the vertical column 57. The roller 76 spaces the cable 70 from the vertical column 57 as the cable feeds on and off the pulley 64.

A bracket 80 that moves up and down along the vertical column 57 comprises a pair of side plates 82 and 84 with a short front plate 86 welded between the side plates 82 and 84 adjacent their upper edges. The space between the side plates 82 and 84 is open below the front plate 86. A hole 88 in the front plate 86 receives the loop 75 of the cable 70. At the lower front of the bracket 80, a pin 90 extends between and is affixed to the side plates 82 and 84. The pin 90 may be welded to the plates 82 and 84 or it may be bolted in place. A roller 92 is rotatably mounted on the pin 90 between the side plates 82 and 84. The roller 92 normally rides against the flat front face 58 of the upright column 57. At the upper rear of the bracket 80, another pin 94 extends between and is fixed to the side plates 82 and 84 by welding or bolting. A roller 96 is rotatably mounted on the pin 94 between the side plates 82 and 84. The roller 96 normally rides against the flat rear face 59 of the upright column 57.

A platform 98 is supported by the bracket 80. The platform 98 comprises a cross rail 100 made of hollow square pipe that is received within square cornered cutouts 102 and 104 in the side plates 82 and 84 of the bracket 80. The cross rail 100 is welded to the side plates 82 and 84. A pair of side rails 106 and 108 are welded to the cross rail 100 and extend forwardly therefrom. Similarly, a pair of intermediate rails 110 and 112 are welded to the cross rail 100 and extend forwardly therefrom. The side rails 106 and 108 and the intermediate rails 110 and 112 are preferably about equally spaced from one another. They may be of the same square hollow pipe as the cross rail 100, as shown, or may be somewhat smaller. A front angle member 114 extends across and is welded to the front ends of the side rails 106 and 108 and of the cross rails 110 and 112.

Figure 2:
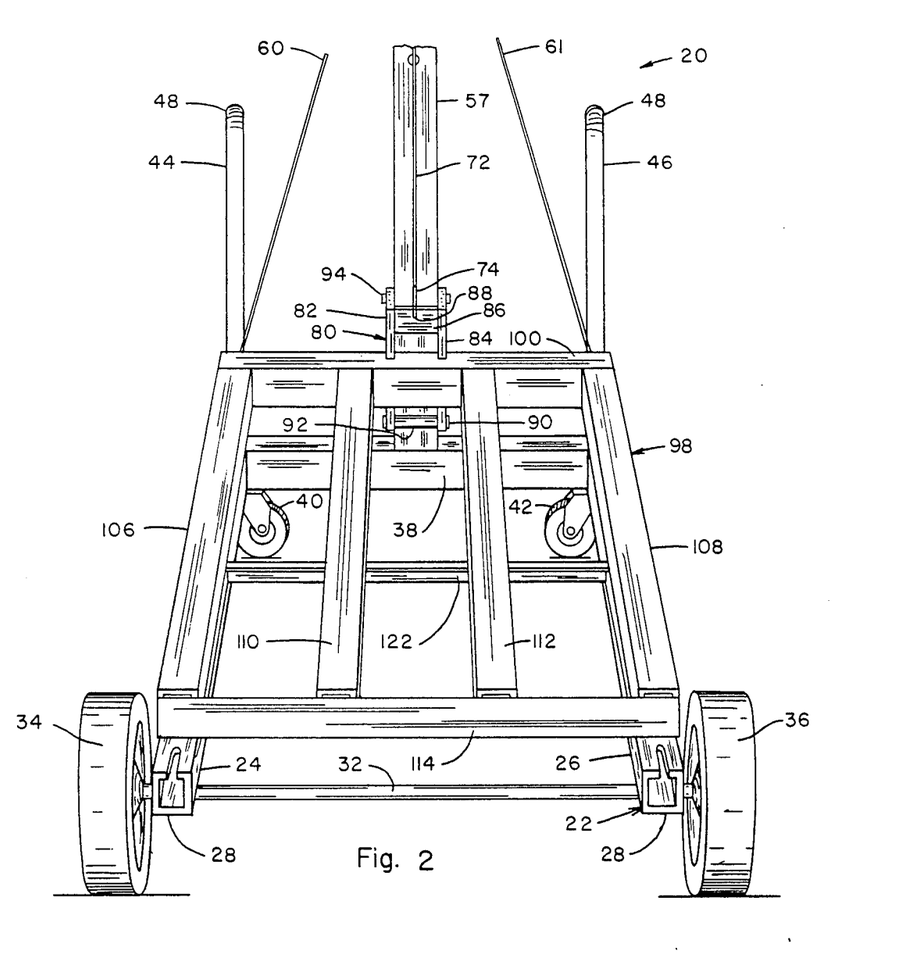
FIG. 2 is a perspective front view of the cart viewed somewhat from above and with part of the vertical column broken away.
Figure 3:
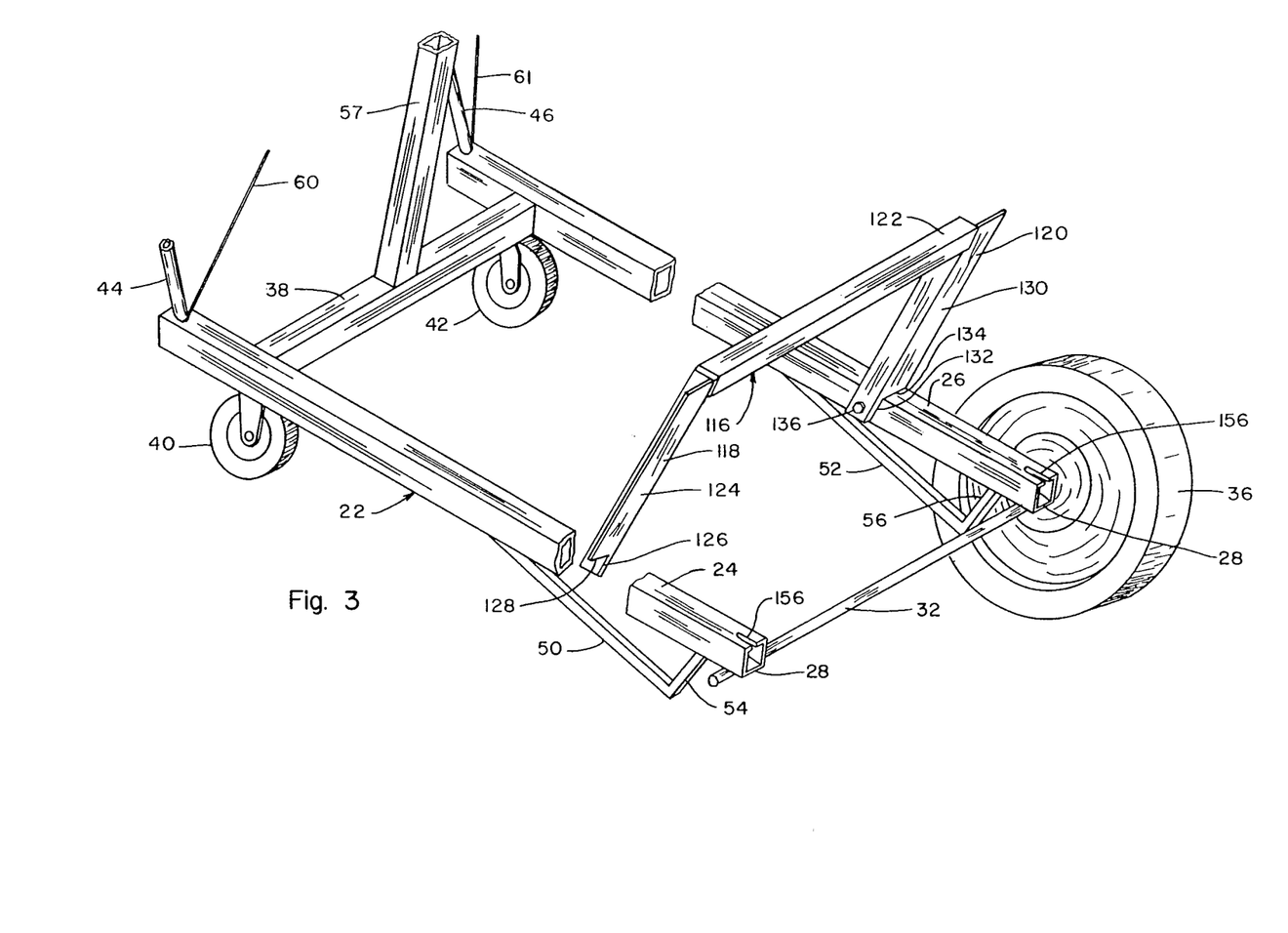
FIG. 3 is a partial perspective view of the lower portion of the cart illustrating the relationship between the base, the wheels, and the pivotally mounted stop.

A stop assembly 116 is pivotably mounted on the base 22. The stop assembly 116 is formed of a pair of side legs or angle members 118 and 120. A cross bar or angle member 122 extends between and is welded to the upper ends of the side angle members 118 and 120. As shown in FIG. 3, the side angle member 119 has a laterally outwardly extending leg 124 with a notch 126 cut in its lower end forming a horizontal edge 128. Similarly, the angle member 120 has a laterally outwardly extending leg 130. A notch 132 is cut in the lower end of the leg 13, leaving a horizontal edge 134. The legs 118 and 120 are fastened to the side frame members 24 and 26 by suitable pivot mounts, such as bolts 136. The stop assembly 116 can be pivoted about the mounting bolts 136 from the position illustrated in FIG. 3 in which the horizontal edges 128 and 134 act as stops against the upper sides of the side frame members 24 and 26 and alternately to a position as indicated in FIG. 2 wherein the stop assembly 116 is pivoted rearwardly to lie against the base 22. In the latter position, the cross angle member 122 fits between the side frame members 24 and 26 so that the stop assembly 116 can lie with its laterally extending legs 124 and 130 resting against the upper sides of the side frame members 24 and 26.

Figure 4:
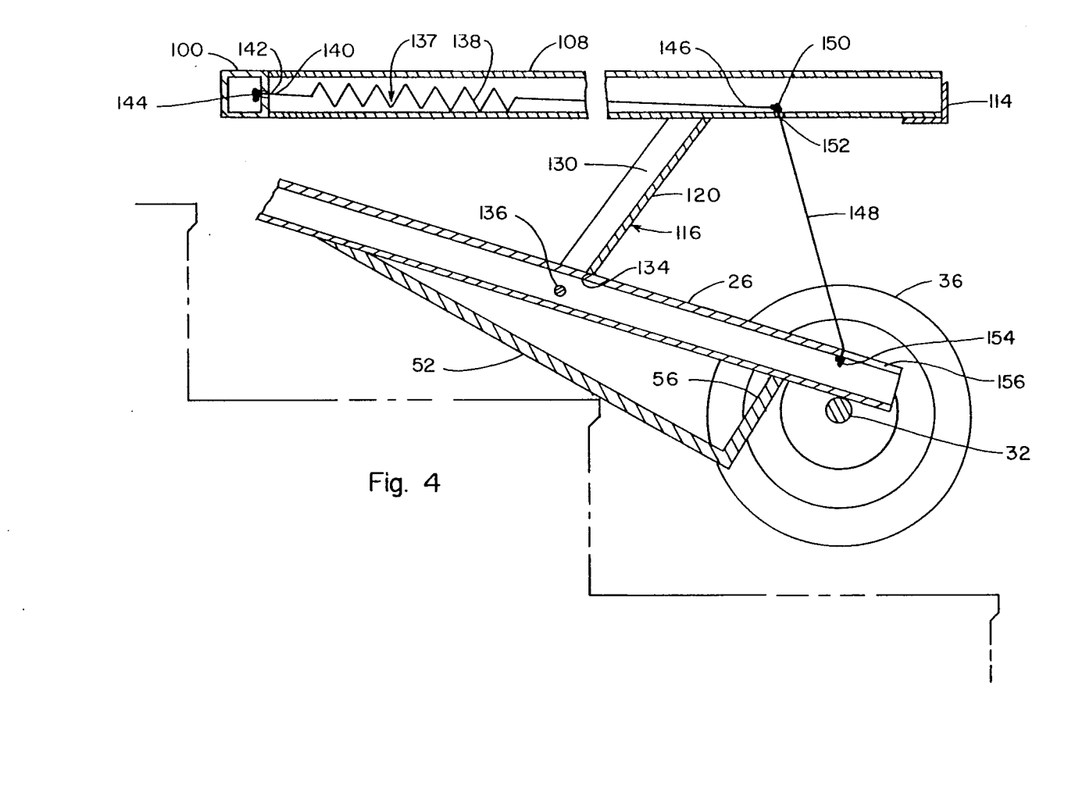
FIG. 4 is an enlarged view in section through the left side of the cart with parts broken away.

Each side rail 106 and 108 of the platform 98 carries a spring and cable combination 137, one of which is illustrated in FIG. 4. As shown there, a coil spring 138 has one end 140 that extends through a hole 142 in the cross rail 100. A knot 144 in the end of the coil spring locks it in place. The other end 146 of the coil spring 138 is connected to a cable 148 at a knot 150. The cable 148 extends through a hole 152 in the bottom of the side rail 108, but the knot 150 is too big to pass through the hole 152. The other end of the cable 148 is also formed with a knot 154.

Each of the side frame members 24 and 26 has a slot 156 in its upper side adjacent the front end 28. The slots 156 are open at their fronts to receive the cables 148. As shown in FIG. 4, although the cable 148 will fit within a slot 156, the knot 154 at the end of the cable is too large to pass through the slot.

OPERATION AND USE

Figure 8:
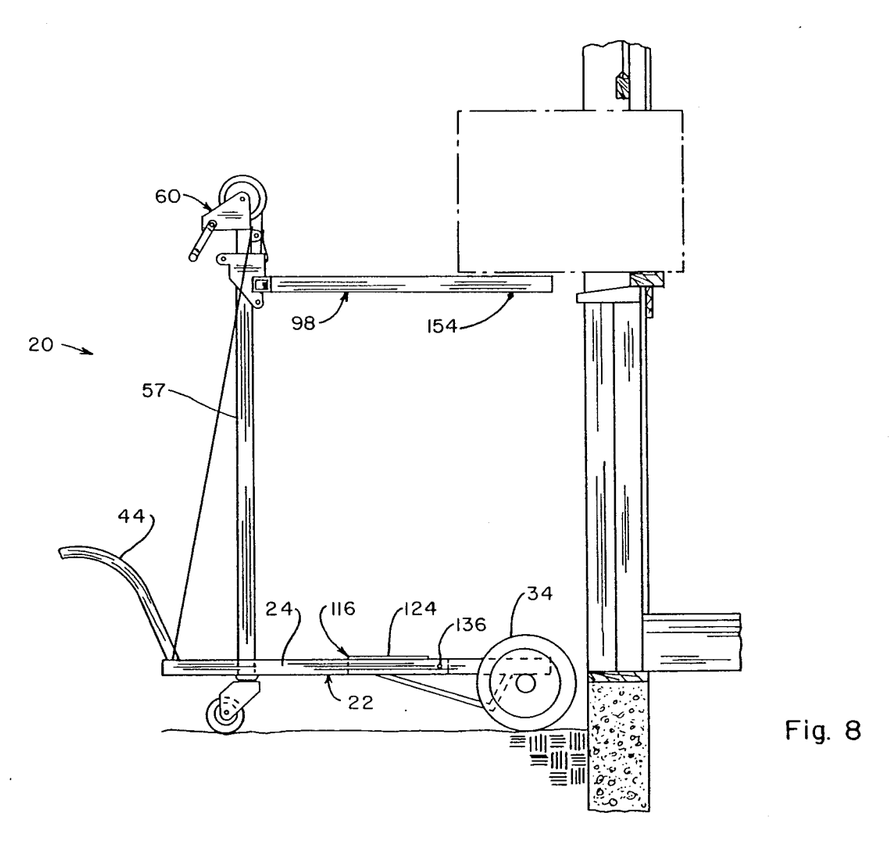
FIG. 8 is a side elevation view of the cart with the platform raised, such as to receive a window air conditioning unit.

This cart is highly useful and versatile. In operation, the height of the platform 98 is controlled by operation of the winch 62. When the handcrank 66 is turned in one direction, the cable 70 winds about the pulley 64, drawing the loop end 74 upwardly, which pulls the bracket 80 upwardly. Because of the weight of the platform 98, the bracket 80 is normally swung to a position with the front roller 92 bearing against the front face 58 of the upright column 57 and the rear roller 96 bearing againt the rear face 59 of the upright column 57. Continued rotation of the crank 66 can raise the platform 98 to a high position such as illustrated in FIG. 8. As is typical of conventional winches, the winch 62 incorporates a dog (not shown) that acts as a stop against the gear train 68. When the dog is swung away from the gear, the crank 66 can be eased to rotate in the opposite direction permitting unwinding of the cable 70 from the pulley 64, lowering the end 74 and therefore lowering the bracket 80 and the platform 98. Re-pivoting of the dog into engagement with the gear teeth will lock the platform 98 at a selected lowered position.

The platform can be totally lowered in a horizontal position as illustrated in FIG. 2. To do so, the front stop assembly 116 should be pivoted to the position illustrated in FIG. 8, lying rearwardly against the side frame members 24 and 26 with the laterally extending legs 124 and 130 overlying the tops of the side frame members 24 and 26. This position may be desirable if the window air conditioner unit is to be stored on the cart and it is desired to remove the load from the stop assembly 116 and the cable 70. Also, there may be times when it is desired to use the cart as a worktable with the platform 98 at its lowest position to provide ready access to the top of the unit by a repair-person.

Figure 6:
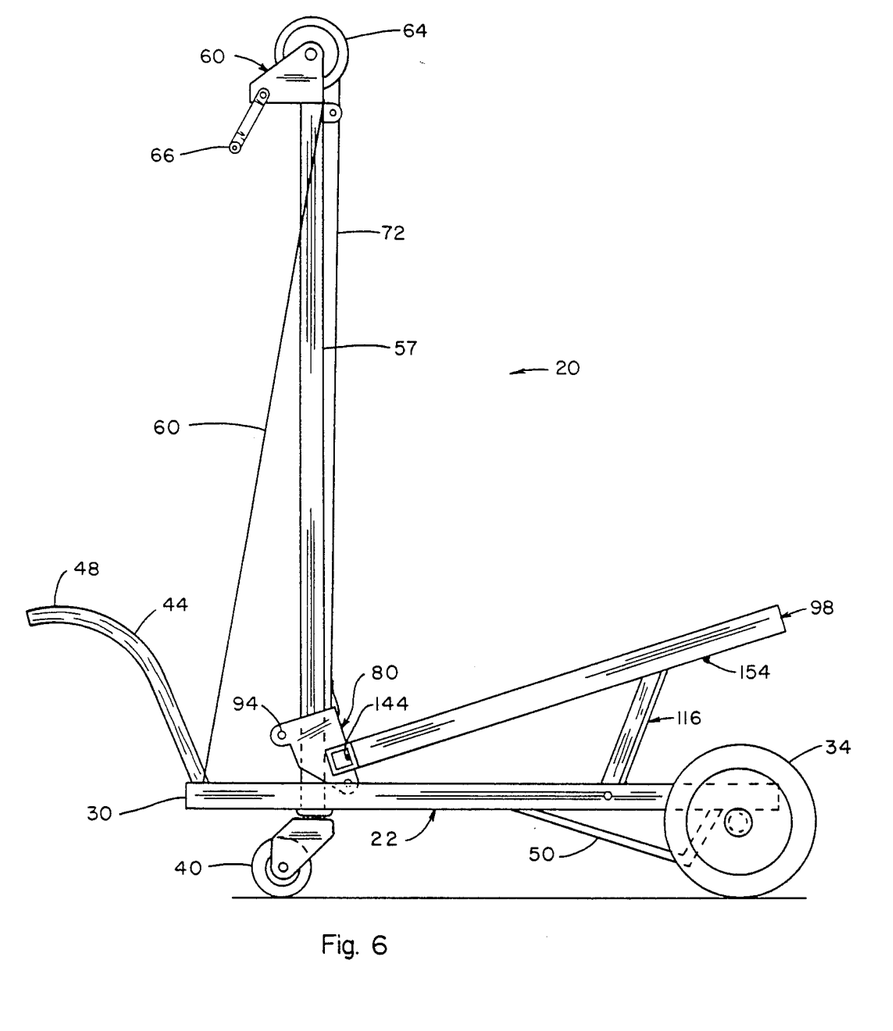
FIG. 6 is a side elevation view of the cart showing the platform in its lowered position.

The platform 98 is shown in FIG. 6 in the normal transporting position. To achieve this position, the platform 98 is raised by operation of the winch 62 so that the stop assembly 116 can be pivoted upwardly to the position illustrated in FIGS. 1 and 6. As the platform is lowered from a position above the stop assembly 116, it will remain in horizontal position until the front of the platform contacts the cross angle member 122. Thereafter, as the winch 62 is further operated to lower the bracket 80, the stop assembly 116 will block the front of the platform 98 from being lowered further. However, the weight of the platform 98 and the bracket 80 (and an air conditioning unit if one is resting on the platform 98) will cause the rear end of the platform 98 to move downwardly as permitted by the unwinding of the cable 70 from the winch 62. Because the bracket 80 is limited only by the rollers 92 and 96, it can pivot to the position illustrated in FIG. 6, thereby allowing the platform 98 to become inclined downwardly in a rearward direction, as the rear end of the platform 98 is lowered. Typically, when an air conditioning unit is resting on the thus inclined platform 98, the air conditioning unit will slide rearwardly until it also rests against the upright column 57 (the cable strand 72 will flex to allow this to happen). This inclined position of the platform 98 allows the rear end of the cart to be raised without tipping the platform forwardly and risking sliding of an air conditioning unit off the front of the platform. This position of the cart 20 is shown in FIG. 7. As seen there, although the rear end of the cart 20 is raised, with the front wheels 34 and 36 still resting on the ground, the platform 98 is still horizontal or even slightly downwardly inclined in a rearward direction. Preferably, the rear of the platform 98 is resting against the base 22 with the front of the platform resting on the stop assembly 116. This provides a solid foundation for transport of an air conditioner. This position of the cart 20, as illustrated in FIG. 7, is the normal transporting position. It is in this position that the hand grips 48 of the handles 44 and 46 are at a height that is comfortable to grip by a person standing erect with his arms extended downwardly. Also, in this position of the cart 20, the hand grips 48 are substantially horizontal so that they will not slip out of the grasp of the repair-person.

When transporting an air conditioner, and certainly when moving it up or down steps, stability will be improved if the cables 146 are engaged. When not in use, these cables 138 are retracted into the side rails 106 and 108 of the platform 98. In other words, the springs 138 draw the cables 146 through the holes 152 (FIG. 4) until the knots 154, which are larger than the holes 152, reach the holes 152, as shown in FIG. 1, and block further withdrawal of the cables 138. To engage the cables, the knots are grasped and pulled from the positions illustrated in FIGS. 1 and 6. This pulls the cables through the holes 152 until, as shown in FIG. 4, the interior knots 150, which are larger than the holes 152, stop further withdrawal of the cables 146. Next the ends of the cables are slid into the slots 156 with the knots 154 below the slots to prevent release of the cables from the slots. In these positions, the cables 148 hold the front of the platform 98 firmly against the stop assembly 116.

It is easier to engage the cables 148 when the platform is in the horizontal position illustrated in FIG. 1. As can be seen in FIG. 4, the holes 152 are a few inches forward of the stop assembly 116. Therefore, after the cables 148 are in place as shown in FIG. 4, further lowering of the platform 98 will further tighten the cables.

The repair-person need not bend his back to raise the rear of the cart 20 from the position illustrated in FIG. 6 to the position illustrated in FIG. 7. He can simply stand between the handles 44 and 46, bend his knees while keeping his back straight and grasp the grip ends 48. With his back held in an upright position and his arms fully extended, the repair-person can straighten his legs, thereby elevating the rear of the cart to the position illustrated in FIG. 7, with essentially no back strain. In the position shown in FIG. 7, the cart 20 can be pushed from one destination to another, such as from the site from which an air conditioning unit was removed to a pick-up truck onto which the air conditioning unit is to be transferred.

To transfer this air conditioning unit to the bed of a pick-up truck, the platform 98 is raised by operation of the winch 62 to a position above the stop assembly 116. Then the stop assembly 116 is pivoted to its lowered position (as illustrated in FIG. 8) and the platform 98 is raised to a level equal to or greater than the height of the truck bed. With the stop assembly 116 lowered, the front wheels 34 and 36 and the base 22 will fit underneath the truck so that the front of the platform 98 can be elevated to the level of the truck bed and be pushed into abutment with the bed. Then the air conditioning unit can simply be slid from the platform 98 onto the truck bed.

FIG. 4 illustrates the use of the glides 50 and 52 in pushing or pulling the cart 20 up or down steps. As shown in FIG. 4, these glides 50 and 52 will contact the edge of the tread to ease the transfer of the front wheels 34 and 36 from one step to another. As mentioned, the cables 148 should be engaged as shown in FIG. 4, particularly if the repair-person wants to lift the cart 20 from its front by applying an upward force on the front of the platform 98.

From the foregoing description, it will be apparent that this combination loader, transport and worktable cart can be used initially to remove a window air conditioner from a window as illustrated in FIG. 8. (It will be recognized that the cart may be positioned outdoors or indoors depending upon the direction of removal of the air conditioner.) The platform 98 is cranked to the elevation of the window sill and the air conditioner is slid onto the platform.

The cart 20 can be used as a workbench with the platform 98 adjustable to any desired horizontal position. This accommodates different sizes of air conditioners and different heights of repair-persons. Since the cart can be used as a workbench, the room air conditioner may be repairable at the site and then reinstalled, significantly reducing the overall repair cost. The cart can be used for removing and reinstalling an air conditioning unit by sliding the unit from a window onto the platform and later returning the air conditioning unit back into a window. The adjustable height of the platform 98 again adapts the cart to the needs of the job, this time to different window heights. The cart can be used as a means to transport an air conditioning unit and while doing so, minimum strain on the back of the repair-person is incurred because of the design of the cart and its handles. To move the cart up or down steps, the repair-person can move around to the front of the cart and lift it by raising the front of the platform 98. In this case, the cables 148 will hold the platform 98 firmly against the stop assembly 116.

While the drawings and the foregoing description illustrate and describe a preferred embodiment of the invention, many variations thereof are contemplated, and the scope of the invention is as set forth in the claims which follow.

What is claimed is:

1. A cart comprising a base having a front and a back, front and back wheels mounted on the base adjacent respectively the front and back thereof, a platform, means connected to the base for supporting the platform while permitting the platform to move generally vertically relative to the base, means to move the platform generally vertically relative to the base, means to hold the platform in a generally horizontal position when the front and rear wheels are on a generally horizontal surface, and means for tilting the platform downwardly toward the back thereof so that when the back of the base is raised thereby tilting the cart about the front wheels, the platform is generally horizontal, including at least two cables connectable between the front of the base and the front of the platform to permit the front of the cart to be lifted by the application of an upward force applied to the front of the platform, wherein the platform comprises a pair of side rails having front and rear ends, a rear cross rail connected to the rear ends of the side rails, a front cross rail connected to the front ends of the side rails, and a plurality of intermediate rails between and parallel to the side rails and connected to the rear and front cross rails, wherein each cable has one end connected to a tension spring and a second end spaced from the tension spring, the tension spring being positioned within and anchored to said side rails to normally draw the cables within the side rails, a hole in the bottom of each side rail through which its respective cable extends, a stop on the second end of each cable, the stops being larger than the holes thereby preventing the second ends of the cables from passing into the hollow side rails, and means on the base defining retainers for the stops when the cables are pulled from the hollow side rails to releasably retain the second ends of the cables in the said retainers.

2. The cart of claim 1 wherein the retainers comprise slots in the base each having an open end for receiving a cable.

3. A cart comprising first and second relatively movable members, one of the members comprising a base, a plurality of wheels supporting the base, a platform support connected to and extending upwardly from the base, the other member comprising a platform supported by the platform support, means to move the platform alternatively upwardly and downwardly along the platform support, a stop supported by one of the members for spacing at least a portion of the platform above the base when the platform is moved downwardly at least as low as a predetermined distance from the base, and at least one cable anchored to one of the members and connectable to the other member to hold both members against the stop, wherein the cable is anchored to the first member, the first member having a hollow rail, a tension spring within the hollow rail and having one end fixed to the hollow rail, means connecting an end of the cable to the other end of the tension spring, the cable extending through a hole in the rail and having a free end outside the rail, the diameter of the hole being smaller than the connecting means, means defining an enlargement at the free end of the cable, the enlargement being larger than the diameter of the hole, whereby the connecting means and the enlargement act as blocks on opposite sides of the hole, a slot in the second member, the slot having an open side for receiving the cable, the width of the slot being less than the diameter of the enlargement, the length of the cable between the connecting means and the enlargement being substantially equal to the distance between the hole and the slot when the members are in contact with the stop.

4. A cart comprising first and second relatively movable members, one of the members comprising a base, a plurality of wheels supporting the base, a platform support connected to and extending upwardly from the base, the other member comprising a platform supported by the platform support, means to move the platform alternatively upwardly and downwardly along the platform support, a stop supported by one of the members for spacing at least a portion of the platform above the base when the platform is moved downwardly at least as low as a predetermined distance from the base, and at least one cable anchored to one of the members and connectable to the other member to hold both members against the stop, wherein there are at least two cables, the cables being anchored to the first member, the first member having a hollow rail corresponding to each cable, a tension spring within each hollow rail and having one end fixed to that hollow rail, means connecting an end of each cable to the other end of its associated tension spring, the cable extending through a hole in the rail and having a free end outside the rail, the diameter of the hole being smaller than the connecting means, means defining an enlargement at the free end of each cable, the enlargement being larger than the diameter of the hole, whereby on each cable the connecting means and the enlargement act as blocks on opposite sides of each hole, a slot corresponding to each cable in the second member, each slot having an open side for receiving a cable, the width of each slot being less than the diameter of an enlargement, the length of each cable between the connecting means and the enlargement being substantially equal to the distance between a hole and a slot when the members are in contact with the stop.

* * * * *